United States Patent
Custer et al.

[11] Patent Number: 5,851,326
[45] Date of Patent: Dec. 22, 1998

[54] METHOD FOR MAKING CERAMIC HONEYCOMB

[75] Inventors: Milton F. Custer, Byron; Hoover Larry Ng, Oakland, both of Calif.

[73] Assignee: Hexcel Corpation, Pleasanton, Calif.

[21] Appl. No.: 548,180

[22] Filed: Oct. 25, 1995

[51] Int. Cl.⁶ .......................... B32B 31/26; C04B 35/80; C04B 35/84
[52] U.S. Cl. ........................ 156/89.22; 156/197; 156/291; 264/630; 264/643
[58] Field of Search ............... 156/89, 197, 291, 156/89.22; 264/630, 642, 643; 427/207.1, 208.6; 428/116, 118

[56] References Cited

U.S. PATENT DOCUMENTS

| | | | |
|---|---|---|---|
| 2,977,265 | 3/1961 | Forsberg et al. | 264/630 X |
| 3,006,798 | 10/1961 | Holland | 156/291 X |
| 3,032,458 | 5/1962 | Daponte et al. | 156/291 X |
| 3,112,184 | 11/1963 | Hollenbach | 156/197 X |
| 3,458,385 | 7/1969 | Bova et al. | 156/291 X |
| 3,493,450 | 2/1970 | Judge, Jr. | 156/291 X |
| 3,700,522 | 10/1972 | Wonderly | 156/197 |
| 3,766,000 | 10/1973 | Gibson et al. | |
| 3,819,439 | 6/1974 | Taylor | 156/89 |
| 3,887,418 | 6/1975 | Jurisich | |
| 3,903,341 | 9/1975 | Gerhold | |
| 3,923,940 | 12/1975 | Hujii | |
| 4,017,347 | 4/1977 | Cleveland | |
| 4,025,681 | 5/1977 | Donnelly et al. | |
| 4,061,812 | 12/1977 | Gilwee Jr. et al. | |
| 4,177,230 | 12/1979 | Mazdiyasni | |
| 4,253,992 | 3/1981 | Soejima et al. | |
| 4,390,583 | 6/1983 | Brazel | |
| 4,585,500 | 4/1986 | Minjolle et al. | |
| 4,591,383 | 5/1986 | McGarry et al. | |
| 4,617,072 | 10/1986 | Merz | |
| 4,642,210 | 2/1987 | Ogawa et al. | |
| 4,645,700 | 2/1987 | Matsuhisa et al. | |
| 4,696,710 | 9/1987 | Minjolle et al. | |
| 4,740,408 | 4/1988 | Mochida et al. | |
| 4,741,792 | 5/1988 | Matsuhisa et al. | |
| 4,767,479 | 8/1988 | Ferguson et al. | |
| 4,822,660 | 4/1989 | Lipp | |
| 4,824,711 | 4/1989 | Cagliostro et al. | |
| 4,828,774 | 5/1989 | Andersson et al. | |
| 4,835,044 | 5/1989 | Hattori et al. | |
| 4,840,827 | 6/1989 | Mizutani et al. | |
| 4,851,608 | 7/1989 | Seip | |
| 4,981,744 | 1/1991 | Swank | 156/197 X |
| 5,000,998 | 3/1991 | Bendig et al. | |
| 5,041,321 | 8/1991 | Bendig | |
| 5,087,500 | 2/1992 | Kasper et al. | |
| 5,198,282 | 3/1993 | Baker et al. | |
| 5,708,818 | 1/1998 | Han et al. | |

FOREIGN PATENT DOCUMENTS 876756  9/1961  United Kingdom ................... 156/197

*Primary Examiner*—Curtis Mayes
*Attorney, Agent, or Firm*—Townsend and Townsend and Crew LLP

[57] ABSTRACT

Ceramic honeycomb (32) is made by applying adhesive (10) to parts of node regions (6) of a stack (12) of ceramic fabrics (2) to bond adjacent fabrics to one another at nodes (20) defined by the adhesive. The ceramic fabric stack is expanded and then impregnated in a ceramic matrix. The impregnated stack (18), dried to be self-supporting but still flexible, can be kiln-fired at this point or it can be encapsulated in an encapsulant (26) such as polyvinyl alcohol. The encapsulated stack (24) is then autoclaved at 100 psi and 185° F. causing the matrix binder to set, thus rigidifying the encapsulated fabric stack. Autoclaving also causes the fabric at the nodes to squeeze together to create intimate contact, and thus high strength bonds during subsequent firing, between the fabrics at the nodes. The encapsulated stack is fired to drive off non-ceramic material to create the ceramic honeycomb. The minimum bending radius of the ceramic fibers at the nodes can be increased using one or more methods.

31 Claims, 3 Drawing Sheets

METHOD FOR MAKING CERAMIC HONEYCOMB

BACKGROUND OF THE INVENTION

It is well known to make honeycomb materials using a variety of materials such as Nomex®, graphite, fiberglass, paper, etc. The high strength, low weight attribute of honeycomb is well known so honeycomb has found extensive application in aircraft structure where weight is at a premium. The same philosophy holds true in high temperature environments. In many of these high temperature applications, metals such as stainless steel, titanium, etc. are used in honeycomb form. However, these metals have a finite point for temperature resistance and deformation properties. As higher temperature, longer term applications are required, the metals are replaced by ceramic materials. Monolithic (single-phase) ceramic honeycombs, such as can be made by extrusion, are very brittle and highly susceptible to catastrophic failure. The extrusion process also limits the size and shape of the piece. The use of continuous fiber ceramic reinforcements in ceramic honeycomb made using the corrugation process was an improvement. However, the node bond adhesive used usually had a problematic coefficient of thermal expansion and poor strength. In addition, it is a severe physical and financial challenge to consolidate the node bond areas of each cell of a ceramic honeycomb made using the corrugated method of manufacture.

With the advent of fabrics woven from ceramic yarns, it was thought that ceramic fabric impregnated with a ceramic matrix could be converted into a honeycomb product using essentially the same expansion-method processing techniques that are used in the manufacture of a honeycomb made of a fiberglass fabric impregnated with a polymeric matrix. However, making ceramic honeycomb using the expansion process has heretofore been impractical. Conventional adhesives do not work well because the adhesives have different coefficients of thermal expansion than the ceramic fiber so that upon firing a weak joint results. Practical ceramic adhesives are not available.

Ceramic honeycomb has been made using the corrugation method from ceramic fabric impregnated with ceramic matrix. The ceramic matrix could include an impregnant which is convertible to a ceramic material when heated (a ceramic precursor) or ceramic materials or a combination. Impregnated fabric was cut into strips with the width of the strip becoming the height of the final honeycomb core. The impregnated fabric, also called the prepreg, was encapsulated in an aluminum foil and corrugated into half hexagon shapes similar to a sine wave with squared corners. This ceramic prepreg corrugation, which was held in the corrugated shape by the encapsulating aluminum foil, was placed in an oven at a temperature sufficient to set or cure the binder or filler in the ceramic matrix to permanently rigidize the corrugated strip. The aluminum foil was then removed and the corrugated strips were stacked on top of each other and bonded with a ceramic high temperature adhesive at the contact points of adjacent strips. See U.S. Pat. No. 5,078,818, the disclosure of which is incorporated by reference. This process is very labor intensive and, more importantly, resulted in very poor node bond strength. This is believed to be because of the difficulty or impossibility of getting good intimate contact between the ceramic fabrics at the nodes using this method.

SUMMARY OF THE INVENTION

The present invention is directed to a method by which ceramic honeycomb can be made with high strength node bonds by providing intimate contact between the ceramic fabric layers at the nodes.

Ceramic honeycomb is made by first applying an adhesive to minor portions of node regions on a plurality of ceramic fabrics such that major portions of the node regions are free of the adhesive. The ceramic fabrics are then stacked so that the adhesive bonds adjacent fabrics to one another at nodes defined by the adhesive. These stacked ceramic fabrics are then expanded and impregnated in a ceramic matrix. The expanded, impregnated fabric is now in the form of a block of honeycomb material and is dried to be self-supporting but still flexible.

It has been found that the block of honeycomb material can be fired at this point to create ceramic honeycomb material with node bond strength superior to that achieved using conventional corrugation methods. If a high shear article is required, instead of firing the block of honeycomb at this time, the honeycomb nodes can be further consolidated by the following procedure.

The expanded, impregnated fabric is then encapsulated in an encapsulant such as polyvinyl alcohol. The encapsulated fabric stack is then autoclaved at, for example, 200 psi and 325° F., causing the fabric at the nodes to squeeze together due to the high pressure to create effectively intimate contact between the fabric at the nodes. Autoclaving also causes the matrix binder to set, thus rigidifying the fabric stack. The fabric stack is now kiln fired which drives off the polyvinyl alcohol, or other encapsulant, the organic solvents and the adhesives and sinters the ceramics to create the ceramic honeycomb. The squeezing of the nodes permits sufficiently intimate fabric-to-fabric contact at the nodes to create a high strength bond between the fabrics at the nodes during the high-temperature firing.

Another problem relates to overstressing the ceramic fibers along the edges of the nodes when the fabric is subjected to a small minimum bending radius. To increase the minimum bending radius at the nodes during expansion, one or more things can be done. First, more adhesive can be used at the nodes to create wider bands of adhesive, preferably thicker, and thus stiffer, at the center of the adhesive and thinning out towards the outer edges; the outer edges of the adhesive overlap the bending ceramic fibers to locally strengthen the fibers. Second, the width of the nodes can be reduced while keeping the pitch constant. Third, the nodes can be oriented at an acute angle, that is at a bias, to the ceramic fibers of the ceramic fabric. Fourth, the expanding step can be interrupted and the partially expanded fabric dipped in a silicone solution or other binder, which may or may not be a ceramic precursor, and then dried. This provides extra strength at the nodes during the subsequent full expansion of the fabric. This fourth solution, if a silicone precursor is used, has an additional advantage; during kiln firing about 50% to 85%, of the silicone, or other ceramic precursor, is transformed to ceramic material.

Other features and advantages of the invention will appear from the following description in which the preferred method has been described in detail in conjunction with the accompanying figures.

DESCRIPTION OF THE PREFERRED METHOD

Figure 1:
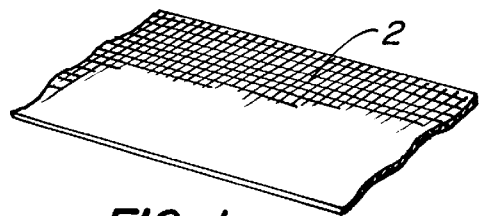
FIG. 1 shows a length of ceramic fabric.

FIG. 1 illustrates a ceramic fabric 2 to be used in making ceramic honeycomb. The fibers forming the fabric may be any fabric which is capable of withstanding and remaining stable at high temperatures, notably those on the order of approximately 1200° C. (2192° F.). The actual material is not critical and may include any of the wide variety of materials meeting this description. Such materials include certain non-metallic elements as well as the metal and non-metal oxides, borides, carbides, nitrides, sulfides and silicides. Further examples are asbestos, graphite and other forms of carbon, boron, Fiberglass, and coated materials such as silicon carbide-coated boron, boron carbide-coated silicon, and silicon-coated silicon carbide.

Preferred fiber materials are ceramic materials, particularly silicates, aluminates, titanates, zirconates, aluminosilicates, silicon carbides, and silicon nitrides and combinations thereof.

The fibers may be in the form of either woven or non-woven cloth, for example paper. The cloth may vary widely in terms of surface finish, weight and, if woven, the type of weave. These parameters are not critical and may be selected in accordance with the desired properties of the final product, which may depend on the scale and physical dimensions of the product and its intended use, as well as the procedures selected for use in processing these materials into the final honeycomb shape.

Examples of fibers which are commercially available and may be used in the practice of the invention are Astroquartz, a quartz fiber available from J. P. Stevens & Co., Inc., New York, N.Y.; Nextel 312 and Nextel 440 alumino borosilicate fibers, and Nextel 550 and Nextel 720 aluminosilicate fibers and Nextel 610 alumina fibers available from 3M Co., St. Paul, Minn.; aluminum oxide-based fibers from E.I. du Pont de Nemours & Co., Inc., Wilmington, Del., and Sumitomo Chemical Co., Ltd. Osaka, Japan; Nicalon, a silicon carbide fiber available from Dow Corning Corp., Midland, Mich.; and Tyranno, a silicon carbide fiber available from UBE, Japan.

Figure 2:
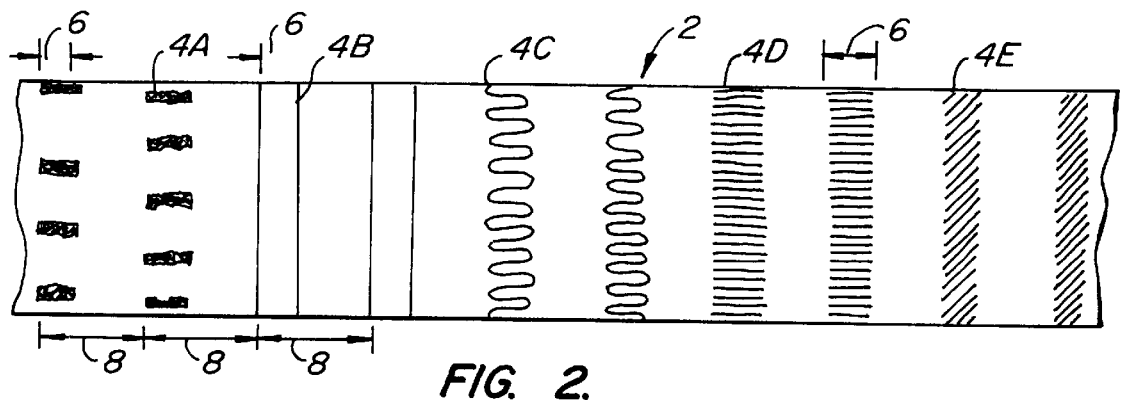
FIG. 2 shows adhesive applied to the ceramic fabric of FIG. 1 in different adhesive patterns.

FIG. 2 illustrates different adhesive patterns 4 applied to fabric 2, each set of adhesive patterns creating a node region 6. The adhesive is preferably a high viscosity thermoplastic organic adhesive designated 832 made by Hexcel Corp. Adhesive patterns 4 are seen to occupy only a minor part, that is preferably about 12% to 50% of node region 6. As shown in FIG. 2, adhesive pattern 4 can be of a variety of types such as segmented adhesive pattern 4A, parallel rail adhesive pattern 4B, multiple S-shaped or wave shape adhesive pattern 4C, longitudinal-dashed adhesive pattern 4D or diagonal-dashed adhesive pattern 4E. Each node region 6 is separated from the adjacent node region 6 by a pitch 8. Pitch may be varied either uniformly or non-uniformly to yield different honeycomb geometry. While FIG. 2 shows fabric 2 having five different adhesive patterns 4A–4E, this is primarily for purposes of illustration; typically the same adhesive pattern would be used for any single fabric 2.

Figure 3:
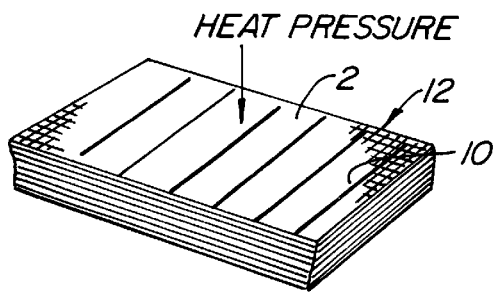
FIG. 3 illustrates the fabric stacking step in which several lengths of the fabric of FIG. 2 are stacked one on top of the other with the node regions offset.

FIG. 3 illustrates a fabric stacking step by which a number of ceramic fabrics 2, having adhesive 10 applied thereto in adhesive patterns 4, are stacked one on top of another. Upon application of heat and pressure, typically about 365° F. (185° C.) and 100 psi (70,310 Kg/M$^2$) for 60 minutes, during the fabric stacking step of FIG. 3, the layers of fabric 2 of the resulting fabric stack 12 becomes adhered together. Adhesive patterns 4 of adjacent sheets are laterally offset in a manner such that during the fabric expansion step of FIG. 4, an expanded honeycomb fabric stack 14 is created. At this point expanded fabric stack 14 is not stiff or rigid so that it is typically placed in some sort of a frame or holder (not shown), as is conventional, to keep expanded fabric stack 14 in the expanded condition during subsequent processing steps.

Figure 5:
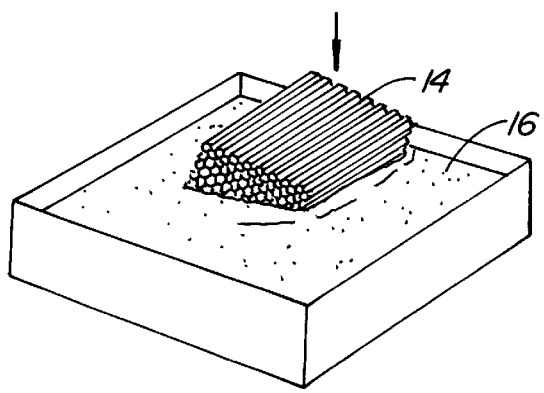
FIG. 5 illustrates the ceramic matrix impregnating step in which the expanded fabric stack of FIG. 4 is impregnated with a ceramic matrix.

FIG. 5 illustrates expanded fabric stack 14, shown without the frame for ease of illustration, being dipped into a ceramic matrix slurry 16. The slurry may be applied to the fabric in single or multiple dips. Multiple dips are a convenient way of controlling or adjusting density and may include liquid phases varying in the solids loading. Successive dips may be performed with intervening drying steps to remove at least part of the liquid vehicle. Other methods of impregnation, such as sponging or spraying, can also be used.

Slurry 16 is, in this preferred embodiment, made of alumina, binder, filler and solvent. The liquid may be a solution, suspension or colloidal suspension (for example, sol gels) of the ceramic material, or of a precursor to the ceramic material, in either case one which converts to the desired form upon heating. The liquid vehicle for the solution or suspension may be any conventional solvent or suspending liquid. Common examples are water and organic solvents such as hexane, xylene, acetone and alcohol. The solids loading in any particular dip and hence viscosity may vary. Both however will affect both the process and the final product. The optimum loading for any procedure will depend on the number of dips to be performed, the type of ceramic used, the density and weave of the fabric, and numerous other considerations encountered in the process. The appropriate choice will be readily apparent to those skilled in the art. In most applications, best results will be obtained with liquid phases having solids contents within the range of about 10% to about 75% by weight, preferably from about 25% to about 60%.

The choice of ceramic material may include any of the wide variety of ceramic materials known in the ceramics art. The main classes of such materials are metal and non-metal oxides, borides, carbides, nitrides, sulfides and silicides.

Both naturally occurring and synthetic ceramic materials may be used, the naturally occurring materials including both clay-derived and non-clay-derived materials. Examples of minerals and compounds of various kinds which may be used as the ceramic material are as follows: silica, kaolinite, montmorillonite, illite, gibbsite, diaspore, bauxite, hallyosite, dickite, macrite, nontronite, beidellite, hectorite, saponite, bentonite, muscovite, hydromicas, phengite, brammallite, glaucomite, celadonite, olivine, anthophyllite, tremolite, actinolite, chrysolite, forsterite, fayalite, spodumene, lepidolite, amblygonite, petalite, barite, witherite, fluorspar, apatite, baddeleyite, zirkite, zircon, titania, rutile, brookite, quartz, biotite, limonite, vermiculite, aluminum oxide, calcium oxide, magnesium oxide, iron oxide, mullite, tridymite, cristobalite, albite, nephelite, anorthite, magnesite, orthoclase, gypsum, chromite, andalusite, sillimanite, kyanite, pyrophyllite, talc, anatase, thoria, silicon carbide, boron carbide, zirconium carbide, hafnium carbide, tantalum carbide, vanadium carbide, molybdenum carbide, tungsten carbide, niobium carbide, beryllium nitride, boron nitride, aluminum nitride, silicon nitride, cerium sulfide, and thorium sulfide.

Preferred groups among these ceramic materials are silicates, aluminates, titanates, zirconates, aluminosilicates, silicon carbides, and silicon nitrides. Among these, silicates, aluminosilicates and silicon carbides are more preferred. Silicon-containing materials in general are particularly preferred, either as silicates or silicon carbides, either alone or in combination with aluminum containing materials such as aluminum oxides.

Examples of commercially available materials suitable for use in forming the continuous ceramic phase are as follows:

Sol gel precursors: Nalco 1050, a colloidal suspension of $SiO_2$ particles, approximately 3nm in size, in water, available from Nalco Chemical Co. Oakbrook, Ill.; Ludox, an $Al_2O_3/SiO_2$ combination in water, available from E.I. du Pont de Nemours & Co., Inc., Wilmington, Del.; and similar materials available from The PQ Corporation, Valley Forge, Pa., and National Starch & Chemical Corp., Bridgewater, N.J.

Polymeric precursors: T, TB and TZ, silicon carbide precursors available from Ethyl Corporation, Baton Rouge, La.; Pyrofine A, Pyrofine S, and Pyrofine P, polymers available from Atochem, Inc., France; and polycarbosilanes available from Nippon Carbon Company, Japan, through Dow Corning, Midland, Mich. and SR350 from General Electric Sicones, Waterford, N.Y.

Fillers or other additives may optionally be included with the ceramic materials for purposes of controlling certain parameters to desired levels. These parameters include those of relevance to the impregnation procedure, the honeycomb forming procedure, or the characteristics of the final product, or combinations of these. Such parameters include viscosity, pH, color and density. The fillers may be other ceramic materials, usually in the form of powders or whiskers, clays, or any other additives known among those skilled in the art for similar purposes. One example of a filler, used with a $SiO_2$ gel sol ceramic precursor, is pure mullite at a level of 10% by volume.

Figure 6:
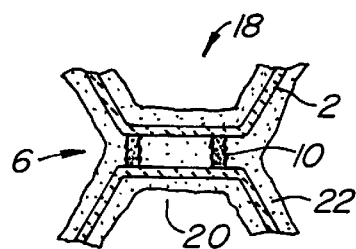
FIG. 6 is an enlarged cross-sectional view of one of the nodes of the ceramic matrix-impregnated fabric stack following the impregnation step of FIG. 5.

The result of dipping expanded fabric stack 14 in slurry 16 is a ceramic material impregnated stack 18, a node 20 of which is shown in cross-section in FIG. 6. Stack 18 is typically air dried so that a ceramic slurry 16 forms a ceramic matrix 22 as shown in FIG. 6. Because the majority of node regions 6 are free of adhesive 10, ceramic matrix 22 not only coats the free surfaces of fabrics 2, but also occupies the region of nodes 20 not occupied by adhesive 10.

Stack 18 can be kiln fired at about 870° C. for about 5 hours using a stepped schedule to create ceramic honeycomb. This ceramic honeycomb has superior node bond strength compared with conventional corrugated ceramic honeycomb due to the use of adhesive patterns 4 which occupy only a minor part of node region 6. The use of adhesive patterns 4 permits ceramic matrix 22, which occupies most of the region of nodes 20, to create a strong bond between fabrics 2 during firing. However, instead of kiln firing stack 18 at this point, the following procedures can be used to achieve stronger node bonds.

Figure 7:
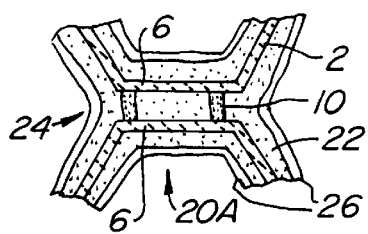
FIG. 7 shows the node of FIG. 6 after an encapsulation step in which the ceramic matrix-impregnated fabric stack has been encapsulated within an encapsulant.
Figure 8:
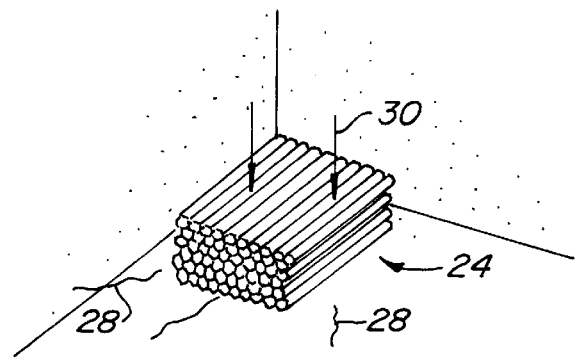
FIG. 8 suggests the squeezing step in which the encapsulated fabric stack of FIG. 7 is autoclaved at an elevated pressure and temperature which squeezes the ceramic fabric together at the nodes and sets the matrix binder thus eliminating the need for the frame.
Figure 9:
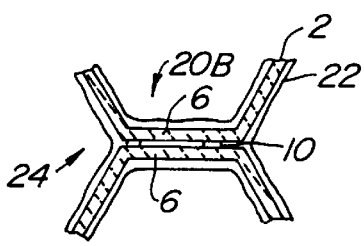
FIG. 9 is a cross-sectional view of the node of FIG. 7 after the squeezing step of FIG. 8 showing the effectively intimate contact between the node regions of the fabric as a result of the application of pressure during the squeezing step of FIG. 8.

Stack 18 is, instead of being kiln fired, dipped into some sort of encapsulant, such as polyvinyl alcohol (PVA), to create an encapsulated, impregnated, expanded stack 24, one node 20A of which is shown in FIG. 7. Other film-forming encapsulants, such as poly-vinyl acetate, can also be used. Encapsulated stack 24 has an encapsulating layer 26 covering ceramic matrix 22. The encapsulating layer is dried and encapsulated stack 24 is then autoclaved as suggested in FIG. 8. During autoclaving encapsulated stack 24 is subjected to heat 28, preferably about 150° F.–325° F., and more preferably approximately 185° F., and pressure 30, preferably about 50–200 psi, and more preferably approximately 100 psi, for about 1 hour. This not only sets the ceramic matrix 22 to rigidify encapsulated stack 24 but also squeezes the fabric 2 together at nodes 20 to create an effectively intimate contact between node regions 6 of adjacent ceramic fabrics 2. This is suggested by the difference in the spacing between node regions 6 of FIGS. 7 and 9.

Figure 10:
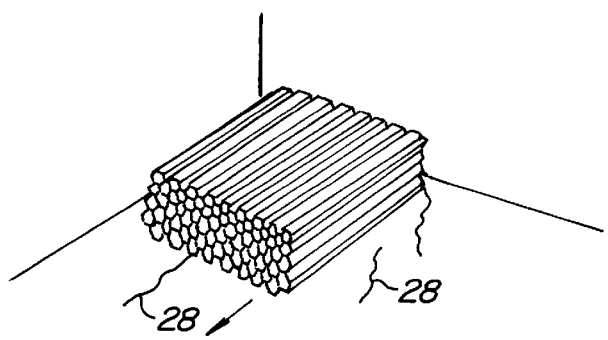
FIG. 10 suggests the firing step in which the squeezed fabric stack is heated to a temperature sufficient to create the ceramic honeycomb.
Figure 11:
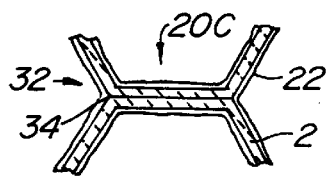
FIG. 11 illustrates the node of FIG. 9 after the firing step of FIG. 10.

At this point the frame (not shown) can be removed since encapsulated stack 24 is sufficiently rigid to be self-supporting. Encapsulated stack 24 is then kiln-fired as suggested in FIG. 10 at about 870° C. for 5 hours, typically in the presence of oxygen for oxide ceramics and nitrogen for non-oxide ceramics. Doing so drives off all organic material leaving ceramic materials only to form a ceramic honeycomb 32, see FIG. 12, one node 20C of which is shown in FIG. 11. As seen in FIG. 11, all that is left is ceramic fabric 2 and ceramic matrix 22. The bond strength at node 20C is quite high because of the close, effectively intimate spacing of ceramic fabrics 2 at node 20C.

Figure 13:
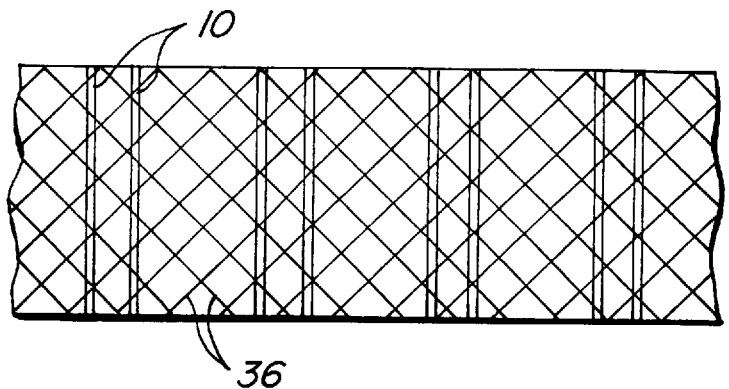
FIG. 13 illustrates orienting the node regions at an acute angle to the ceramic fibers to increase the minimum radius the ceramic fibers must endure when expanded.
Figure 14A:
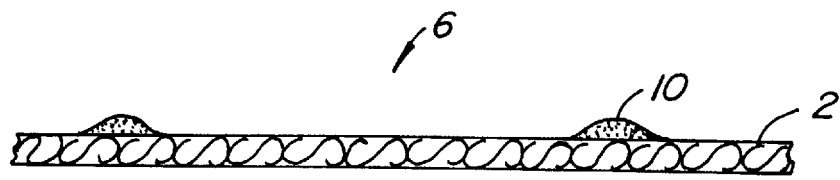
FIGS. 14A and 14B illustrate enlarged side cross-sectional views of a node region showing conventional adhesive placement in FIG. 14A and an increased adhesive placement in FIG. 14B which helps to strengthen the fabric at the edges of the node region to help increase the minimum bending radius of the ceramic fibers of the fabric during the expansion step of FIG. 4.
Figure 14B:
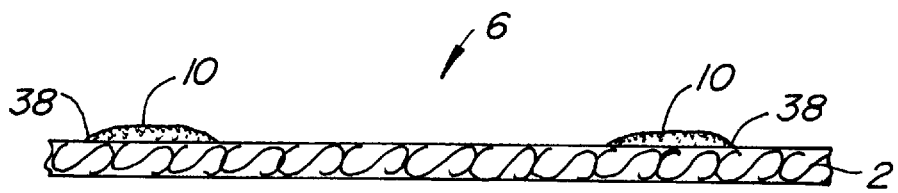

It has been found that ceramic fabric 2 can be weakened at the edges 34 of node regions 6 when the bending radius at the edges is small. Methods for increasing the minimum radius of curvature of the ceramic fibers constituting ceramic fabric 2 include the following. One way is to reduce the width of node regions 6, see FIG. 2, while maintaining the pitch 8 constant so node regions 6 are about 2 to 15% of the node-to-node pitch. A second way, shown in FIG. 13, is to orient adhesive 10 at an acute angle to the orientation of ceramic fibers 36. A third way is shown with reference to FIGS. 14A and 14B. FIG. 14A illustrates the placement of adhesive 10 in the parallel adhesive pattern 4B of FIG. 2. FIG. 14B illustrates the use of a greater amount of adhesive 10 which feathers out at its outer edges 38. Feathering or extending the outer edges 38 of adhesive 10 provides additional strength for ceramic fabric 2 along edges 34 of node regions 6 thus increasing the minimum radius of curvature along those edges.

Figure 4:
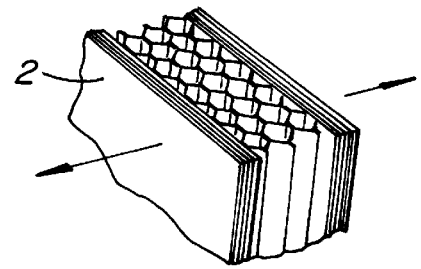
FIG. 4 illustrates the fabric expansion step in which the fabric stack of FIG. 3 is expanded to create an expanded fabric stack in a generally honeycomb shape, the expanded fabric stack typically being held within a frame, not shown, for physical support.

An additional method of increasing the minimum radius along edges 34 interrupts the fabric expansion step of FIG. 4. After ceramic fabrics 2 have been partially expanded, the partially expanded fabric stack is then dipped in a stiffener solution, for example, a 3% acetone solution of silicone SR350, made by General Electric Company, and air dried. The partially expanded fabric stack is then fully expanded to continue with the processing starting with FIG. 5. The stiffener solution provides a binder function which stiffens the fibers of ceramic fabric 2 and forms a bonded fiber bundle which provides adequate strength for expansion. In addition, the use of the silicone material, as opposed to normal binders which are fugitive and which create burnoff gas and subsequent porosity which must be dealt with, provide an additional advantage. The silicone used has a 50 to 85% conversion factor to silica, a ceramic material, which becomes an integral part of the ceramic honeycomb 32. Also, it may be possible to heat the stiffener solution-dipped expanded fabric to, for example, up to 325° F., to cure the silicone and rigidize the expanded fabric so that further processing can be done without the frame.

Figure 12:
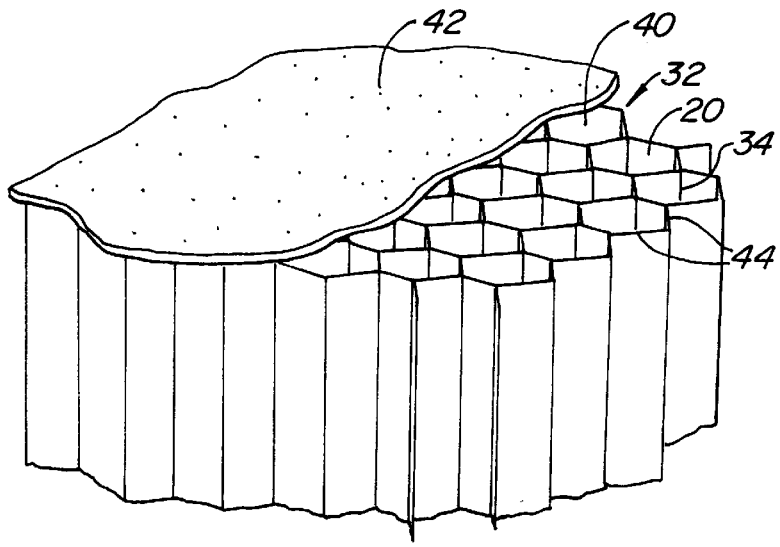
FIG. 12 is an overall view of a portion of a ceramic honeycomb made according to the invention having a portion of a face sheet, bonded to the cell edges, broken away.

Often ceramic honeycomb 32 is designed to have its open ends 40 of the honeycomb cells covered by a skin or face sheet 42 as shown in FIG. 12. Bonding a face sheet 42 to the honeycomb cell edges 44 has proven difficult to do well. One method is to fire face sheet 42 and ceramic honeycomb 32 as separate units and secondarily bond face sheet 42 to the honeycomb cell edges 44 with an adhesive. As with the node bond problem, noted above, bonding an already cured ceramic surface to an another already cured ceramic surface often results in a poor bond causing surface sheet delamination. One way of helping to solve this problem is to notch cell edges 44 prior to bonding a precured face sheet 42 to core 32. If a debonding mechanism occurs, the crack which is debonding face sheet 42 from cell edges 44, will be halted at the notch so to halt the propagation of the crack. With a second method, after the ceramic matrix impregnation step of FIG. 5, a non-fired ceramic slurry impregnated face sheet 42 is applied to cell edges 44 and the combination is cured at about 185° F. This can result in skin 42 and edges 44 flowing into one another and becoming integrally bonded with a minimum amount of non-reinforced interface matrix. For increased shear strength over that achieved with the second method, in a third method ceramic slurry impregnated face-sheet 42 is applied to the nonencapsulated cell edges 44 after the encapsulation step. As an alternative to the last two methods, instead of using large face sheets 42, a patchwork of smaller face sheets can be applied to cell edges 44 and then heated as discussed above. In the event of an interbond failure, only the section involved is affected so that the bonding is not transferred to adjoining sections of face sheet 42. A combination of face sheet bonding methods can also be used as appropriate.

The above described methods have been discussed with reference to making plain blocks of honeycomb material. If desired, complex shaped parts can be created by framing the ceramic matrix impregnated stack 18 to the part tool, so that at least part of stack 18 conforms to the surface of the part tool applying skins or face sheets 42 before and/or after applying stack 18 to the part tool, autoclaving or vacuum bagging at curing temperatures to rigidify the structure so that the tool and framing can be removed for further processing steps, including the encapsulating step of FIG. 7.

Other modifications and variation can be made to the disclosed methods without departing from the subject of the invention as defined in the following claims.

What is claimed is:

1. A method for making ceramic honeycomb comprising:

selecting a wave shaped adhesive pattern;

applying an adhesive in the selected wave shaped adhesive pattern to minor portions of node regions of a plurality of ceramic fabrics so that major portions of the node regions are free of said adhesive;

stacking the ceramic fabrics so the adhesive bonds adjacent fabrics to one another at nodes defined by said adhesive to create a fabric stack;

expanding the fabric stack;

impregnating the expanded fabric stack with a ceramic matrix; and heating the impregnated fabric stack to a temperature sufficiently high to create a ceramic honeycomb.

2. A method for making ceramic honeycomb comprising:

applying an adhesive to minor portions of node regions of a plurality of ceramic fabrics so that major portions of the node regions are free of said adhesive;

stacking the ceramic fabrics so the adhesive bonds adjacent fabrics to one another at nodes defined by said adhesive to create a fabric stack;

expanding the fabric stack;

increasing the minimum bending radius of said ceramic fabrics at said nodes by interrupting the expanding step so that after the fabric stack has been partially expanded, a stiffener solution is applied to at least the nodes of the partially expanded fabric stack;

impregnating the expanded fabric stack with a ceramic matrix; and heating the impregnated fabric stack to a temperature sufficiently high to create a ceramic honeycomb.

3. The method according to claim 2 wherein the interrupting step is carried out using a silicone solution comprising a ceramic precursor.

4. The method according to claim 2 further comprising the step of applying a face sheet to an end surface of the ceramic honeycomb.

5. A method for making ceramic honeycomb comprising:

applying an adhesive to minor portions of node regions of a plurality of ceramic fabrics so that major portions of the node regions are free of said adhesive;

stacking the ceramic fabrics so the adhesive bonds adjacent fabrics to one another at nodes defined by said adhesive to create a fabric stack;

expanding the fabric stack;

impregnating the expanded fabric stack with a ceramic matrix;

encapsulating the impregnated fabric stack in an encapsulant;

subjecting the encapsulated fabric stack to an elevated pressure thereby squeezing the fabrics at the nodes towards one another; and heating the squeezed fabric stack to a temperature sufficiently high to create a ceramic honeycomb.

6. The method according to claim 5 wherein the adhesive applying step is carried out using an organic adhesive.

7. The method according to claim 5 wherein the adhesive applying step includes the step of selecting an adhesive pattern.

8. The method according to claim 7 wherein the selecting step is carried out by selecting a parallel line adhesive pattern.

9. A method according to claim 7 wherein the selecting step is carried out by selecting an adhesive pattern comprising at least two adhesive regions separated by a non-adhesive region at a node region.

10. The method according to claim 5 wherein the adhesive applying step is carried out so that said minor portions are about 12% to 50% of said node regions.

11. The method according to claim 5 wherein the impregnating step is carried out by dipping.

12. The method according to claim 5 wherein the heating step is carried out at a sintering temperature.

13. The method according to claim 5 wherein the heating step is carried out at a temperature of about 870° C.

14. The method according to claim 5 further comprising the step of increasing the minimum bending radius of said ceramic fabrics at said nodes.

15. The method according to claim 14 wherein the minimum bending radius increasing step is carried out by increasing the amount of said adhesive at said nodes.

16. The method according to claim 14 wherein the minimum bending radius increasing step is carried out by sizing said nodes so to be about 2% to 15% of a node-to-node pitch.

17. The method according to claim 14 wherein the minimum bending radius increasing step is carried out by orienting said nodes at an acute angle to ceramic fibers of said ceramic fabric.

18. The method according to claim 5 wherein the encapsulating step is carried out using polyvinyl alcohol as the encapsulant.

19. The method according to claim 5 wherein the elevated pressure subjecting step is carried out at an elevated temperature.

20. The method according to claim 19 wherein the elevated pressure subjecting step is carried out at a temperature of about 150° F. to 325° F. and a pressure of about 50 to 200 psi.

21. The method according to claim 5 wherein the elevated pressure subjecting step is carried out at a pressure of about 50 to 200 psi.

22. The method according to claim 5 wherein the elevated pressure subjecting step is carried out at a pressure of about 100 psi and at an elevated temperature of about 185° F. for about 1 hour.

23. The method according to claim 5 further comprising the step of applying a ceramic-matrix-impregnated face sheet to the impregnated fabric stack after the encapsulating step.

24. The method according to claim 23 wherein the applying step is carried out using a plurality of face sheet segments.

25. The method according to claim 5 further comprising the step of conforming at least a part of the impregnated fabric stack to a tool surface and then rigidifying said conformed impregnated fabric stack prior to said encapsulating step.

26. The method according to claim 5 further comprising the step of applying a ceramic-matrix-impregnated face sheet to the impregnated fabric stack prior to the heating step.

27. A method for making ceramic honeycomb comprising:

applying an adhesive to minor portions of node regions of a plurality of ceramic fabrics so that major portions of the node regions are free of said adhesive, said minor portions being about 12% to 50% of said node regions;

stacking the ceramic fabrics so the adhesive bonds adjacent fabrics to one another at nodes defined by said adhesive to create a fabric stack;

expanding the fabric stack;

impregnating the expanded fabric stack with a ceramic matrix;

encapsulating the impregnated fabric stack in an encapsulant;

subjecting the encapsulated fabric stack to an elevated pressure of about 50 to 200 psi and an elevated temperature of about 150° F. to 325° F. thereby squeezing the fabrics at the nodes towards one another; and heating the squeezed fabric stack to a temperature of about 870° C. to create a ceramic honeycomb.

28. The method according to claim 27 further comprising the step of increasing the minimum bending radius of said ceramic fabrics at said nodes.

29. The method according to claim 27 further comprising the step of applying a ceramic-matrix-impregnated face sheet to the impregnated fabric stack prior to the encapsulating step.

30. The method according to claim 27 further comprising the step of conforming at least a part of the impregnated fabric stack to a tool surface and then rigidifying said conformed impregnated fabric stack prior to said encapsulating step.

31. A method for making ceramic honeycomb comprising:

applying an adhesive to minor portions of node regions of a plurality of ceramic fabrics so that major portions of the node regions are free of said adhesive;

stacking the ceramic fabrics so the adhesive bonds adjacent fabrics to one another at nodes defined by said adhesive to create a fabric stack;

expanding the fabric stack;

impregnating the expanded fabric stack with a ceramic matrix so as to also impregnate said major portions of the node regions not occupied by the adhesive;

heating the impregnated fabric stack to a temperature sufficiently high to create a ceramic honeycomb;

scoring an end surface of the ceramic honeycomb; and applying a face sheet to the end surface of the ceramic honeycomb subsequent to the scoring step.

* * * * *